Patented Aug. 28, 1945

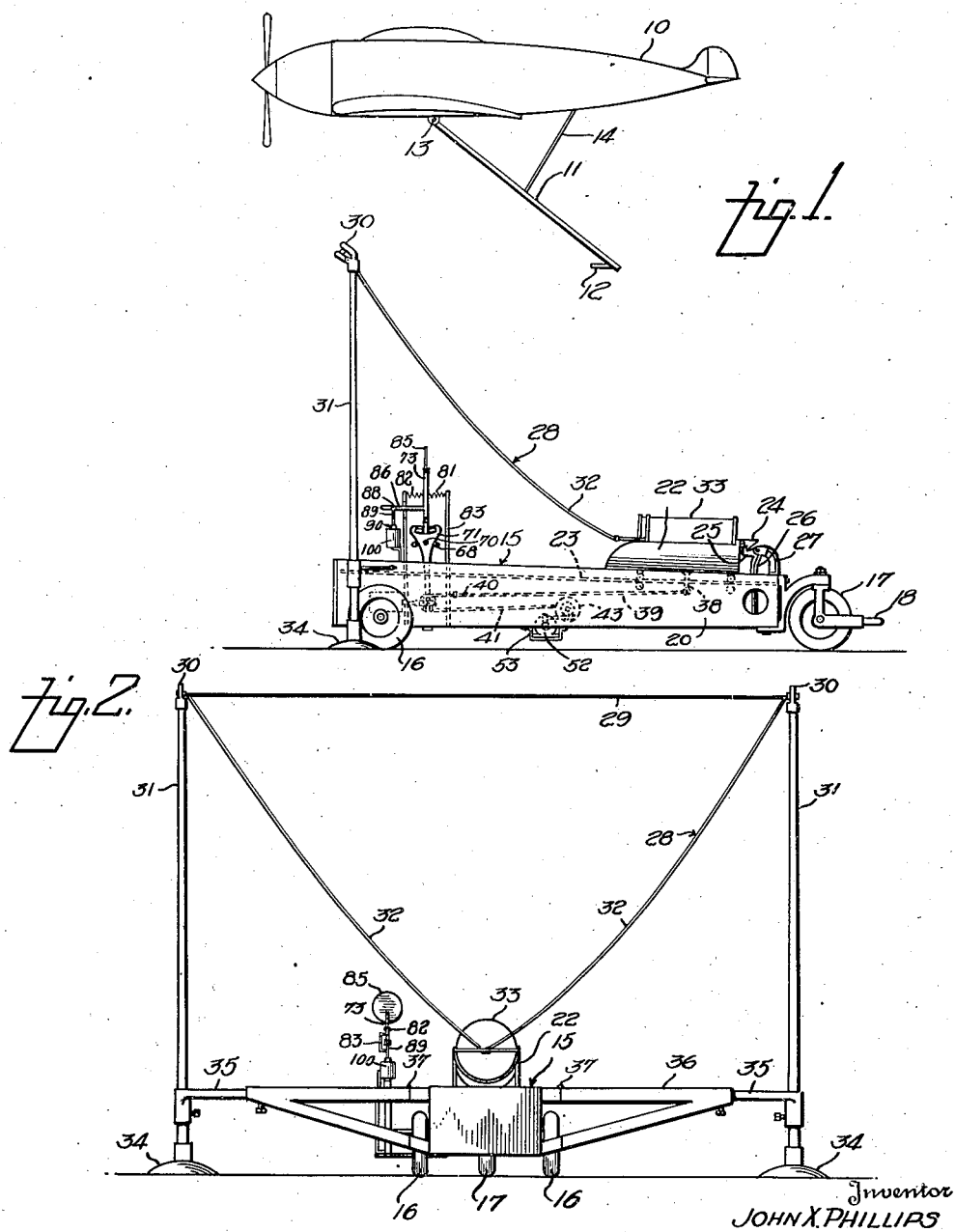

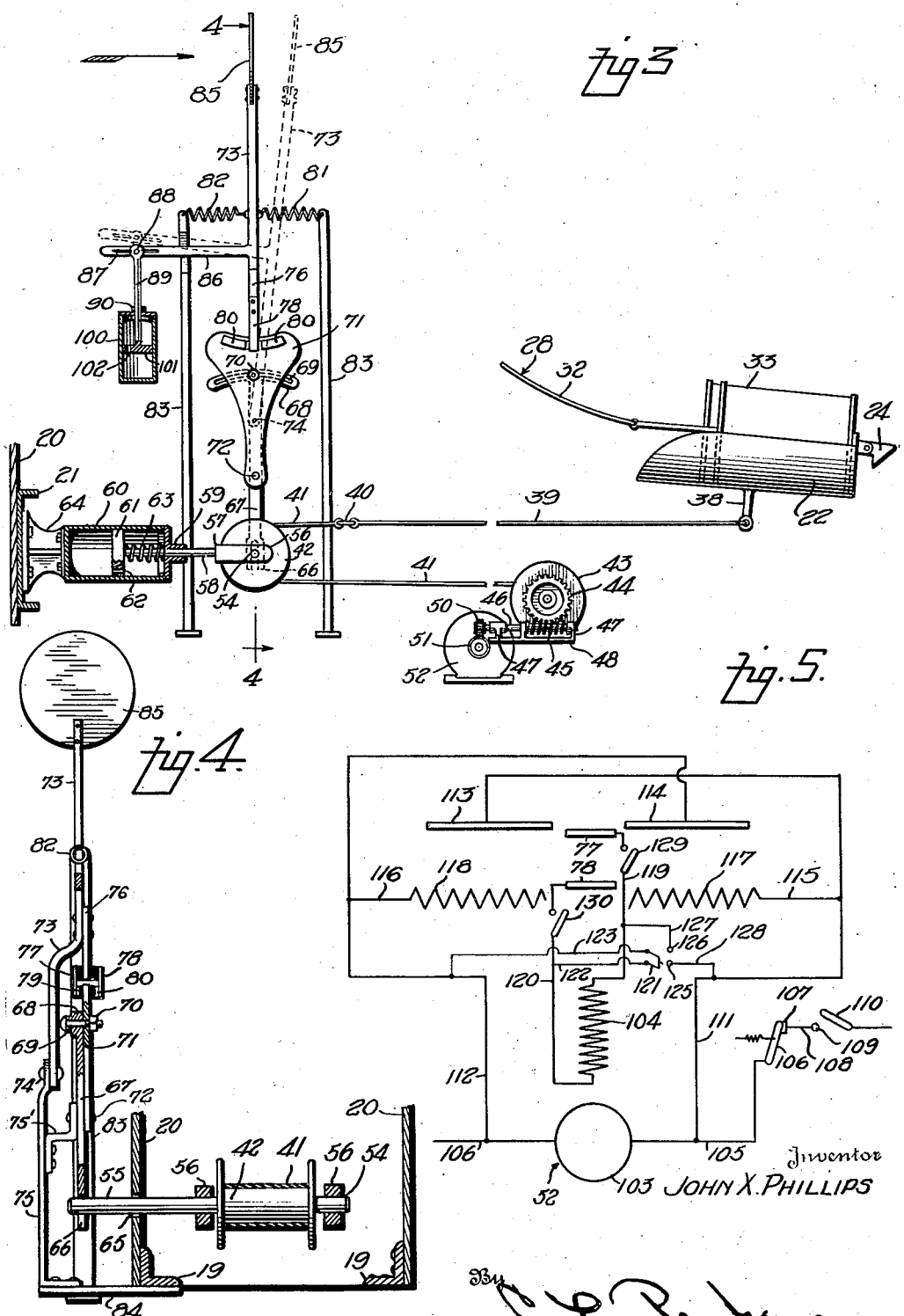

2,383,680

UNITED STATES PATENT OFFICE 2,383,680

AIRPLANE PICKUP MECHANISM

John X. Phillips, Vienna, Va., assignor to G. Tucker Smith and E. Govan Hill, both of Richmond, Va., trustees Application June 22, 1942, Serial No. 448,009

16 Claims. (Cl. 258—1.6)

This invention relates to airplane pick-up mechanisms and more particularly to a mechanism of the type wherein a catapult is employed for projecting the load to be picked up, upon the engagement of an airplane-carried hook with a loop connected to the load.

Several airplane pick-up mechanisms have been developed which are highly efficient in operation for permitting an airplane, without landing, to engage a loop connected to the load to be picked up and in so doing to release a catapult mechanism which projects the load approximately at the speed or flight of the airplane to permit the plane to support and carry the load without any transmission of substantial shock to the plane. These mechanisms are of various specific types and employ a latch which holds the catapult carriage in fixed position; a source of power tending to project the carriage, a pair of spaced masts; and a loop supported by the masts and connected to the article or load on the carriage, means being provided whereby initial engagement of the loop by an airplane-carried hook releases the latch and thus permits the source of power to project the carriage. Devices of this character have been highly successfully operated on numerous occasions. The degree of force exerted on the carrier tending to project it is governed by two factors, namely, the weight of the load and the speed of the airplane which is to pick up the load. Generally speaking, one of these factors ordinarily is considered to be a constant, namely, the speed of the plane, since it is the common practice for the pick-up plane to be flown at an air speed of approximately 100 miles per hour at the time the pick-up operation is performed.

Actually, the speed of the plane cannot be considered to be a constant inasmuch as there is sometimes substantial difference between the air speed and the ground speed of an airplane due to wind velocity, as is well known. Therefore, the operator of a mechanism of this character may increase or decrease the projecting power to compensate for variations in wind speed but the force exerted is varied only according to the judgement of the operator and thus is extremely inaccurate. This inaccuracy is of no consequence when picking up relatively light loads but progressively becomes a more serious consideration as attempts are made to pick up progressively heavier loads.

An important object of the present invention is to provide a novel mechanism for automatically determining the force applied by the source of power to tend to move the catapult in accordance with variations in wind velocities, thus far more accurately discharging the article at a speed equal to that of the land speed of the airplane.

A further object is to provide means whereby the apparatus may be initially set according to the load to be projected and which initial setting will be automatically changed in accordance with variations in the velocity of the wind whereby the article to be picked up will be discharged at a proper speed taking into consideration both the weight of the article and the land speed of the airplane.

A further object is to provide a novel apparatus of the character referred to which is particularly adaptable for use with a tensioned shock cord device employed as the means for projecting the catapult carriage.

A further object is to provide a mechanism of the character just referred to wherein a windlass is employed for tensioning the shock cord employed for projecting the catapult carriage, and wherein automatic means operates to wind or unwind the windlass to vary the tensioning of the shock cord device in accordance with variations in the wind velocity.

Other objects and advantages of the invention will become apparent during the course of the following description.

In the drawings I have shown one embodiment of my invention. In this showing—

Figure 1 is a side elevation of the apparatus showing a plane flying thereover and about to engage the pick-up loop, Figure 2 is a front elevation of the apparatus, Figure 3 is an enlarged side elevation of parts of the catapult mechanism, most of the catapult vehicle being omitted, Figure 4 is a detailed sectional view on line 4—4 of Figure 3, and, Figure 5 is a diagram of the wiring system used in conjunction with the apparatus.

Referring to Figure 1 the numeral 10 designates an airplane of any desired type below which is suspended an arm 11 having a pick-up hook 12 at its lower end engageable with the pick-up loop, to be referred to later. The arm 11 may be pivoted as at 13 to the bottom of the fuselage of the plane to be swung upwardly to inoperative position upon the upward pulling of a cable 14. The hook 12 may be carried by a cable (not shown) housed in the arm 11 whereby it may be pulled upwardly toward the bottom of the plane which is provided with a door (not shown) through which the article may be pulled into the plane after having been picked up. The portions of the pick-up mechanism associated with the plane form no part per se of the present invention and need not be illustrated in detail.

The apparatus forming the subject matter of the present invention comprises a vehicle 15 supported at one end by wheels 16 and at its opposite end by a caster wheel 17 provided with a draft connection 18 whereby the apparatus may be pulled to any desired spot on the pick-up field and turned in any direction in accordance with the direction of the wind. The vehicle 15 may be of any suitable construction and forms per se no part of the present invention. The vehicle is preferably formed of any suitable type of structural framing 19 (Figure 4) to which are secured closure plates 20. The forward end of the vehicle is provided with a relatively heavy transverse structural element 21 (Figure 3) for a purpose to be described.

A catapult carriage 22 is supported for movement in the vehicle 15 by any suitable form of trackway means generally indicated by the numeral 23 in Figure 1. The particular form of carriage and the trackway supporting means therefor is of no importance in connection with the present invention. The carriage 22 is provided with a detent 24 (Figures 2 and 3) engageable by a hook 25 carried by a lever 26 pivotally connected to a bracket 27. This latch is releasable by any suitable means (not shown) upon the engagement by the hook 12 with a pick-up loop 28, for example, by the means shown and described in the prior patent to Jeannot G. Ingres and Henry W. Hey, No. 2,356,671, issued August 22, 1944. The loop 28 has a horizontal portion 29 adapted to be supported by clips 30 arranged at the upper ends of masts 31, and the loop further comprises downwardly and rearwardly converging portions 32 connected at their rear ends to an article 33 arranged in the carriage 22. The clips 30 may be electrical switch elements movable into contact with each other upon the pulling of the loop portion 29 by the hook 12 to close a circuit through a solenoid to operate the lever 26 and release the hook 25 from the detent 24, as fully disclosed in the prior patent referred to. The masts 31 may be of any suitable type and may be supported at their lower ends by mushroom bases 34. Rods 35 connected to the masts may operate in sockets 36 pivoted as at 37 with respect to the vehicle 15 to be swung to inoperative positions adjacent and parallel to the sides of the vehicle when the apparatus is not in use. Under the latter condition, the masts will be disconnected from the bases 34 and arms 35 and laid on the top of the vehicle whereby the apparatus as a whole occupies minimum space for transportation.

The carriage 22 is provided with a depending structure 38 to which one end of a shock cord device 39 is connected. Any number of shock cords may be employed depending upon the maximum load to be projected by the catapult, and as is well known, the shock cord is formed of a substantial number of rubber threads housed within an extensible fabric casing. The other end of the shock cord device is secured to a connection 40 which, in turn, is connected to one end of a flexible belt 41 passing around a pulley 42. The other end of the belt 41 is wound about the drum of a spool 43 (Figure 3) forming part of a windlass mechanism for elongating the shock cord device 39. The spool or drum 43 carries a gear 44 meshing with a worm 45 carried by a shaft 46 journalled in bearings 47, and these bearings are supported by a bracket 48 suitably connected to the vehicle 15. A worm wheel 50 (Figure 3) is carried by the shaft 46 and meshes with a worm 51 on the drive shaft of an electric motor 52 and this motor is connected to the vehicle 15 by suitable bracket means 53 (Figure 1). The motor 52 is reversible, as will become apparent, and accordingly the drum 43 may be turned in either direction to wind or unwind the belt 41 with respect thereto.

The pulley 42 carries stub shafts 54 and 55 at its respective ends (Figure 4) and these shafts are mounted in the arms 56 of a yoke 57 which carries a shaft 58 centrally thereof (Figure 3). The shaft 58 extends through a bearing 59 carried by one end of a cylinder 60 in which is arranged a piston 61 drilled to provide a leakage port 62. A relatively heavy coil spring 63 urges the piston 61 to the left as viewed in Figure 3. The cylinder 60 is carried by a bracket 64 secured to the frame member 21. It will be apparent that the shafts 54 and 55 are wholly supported by the yoke 57, shaft 58 and cylinder 60. However, the supported weight is not great and the maximum strain on the yoke 57 occurs horizontally, and this strain is adequately taken up by the supporting means referred to. It will be apparent that as the belt 41 is wound on the drum 43 the pulley 42 is pulled to the right as viewed in Figure 3 against the relatively heavy tension of the spring 63.

Referring to Figure 4 it will be noted that the shaft 55 projects through a slot 65 in one of the plates 20, this slot being sufficiently long to take care of maximum horizontal movement of the shaft 55 under various conditions to be described. The outer end of the shaft 55 is engageable by a fork 66 formed at the lower end of a lever 67 provided at its upper end with an arcuate portion 68 having an arcuate slot 69 therein. A bolt 70 projects through the slot 69 and through a plate 71 formed as shown in Figure 3 and pivotally connected as at 72 to the lever 67. Upon the loosening of the bolt 70 the plate 71 may be turned about the axis of the pivot 72 and secured in adjusted positions, the slot 69 obviously being concentric with the pivot point 72.

Arranged adjacent the lever 67 and plate 71 is a lever 73 pivotally supported at its lower end as at 74 on the upper end of a bracket 75 suitably connected to the vehicle 15. The pivot element 72 may be conveniently supported by a bracket arm 75' carried by the bracket 75 (Figure 4). The lever 73 is provided with a depending arm 76 (Figure 4) and the lower end of this arm carries a pair of contacts 77 and 78 respectively, suitably insulated from the arm 76 and engageable with elements 79 and 80 respectively, carried by and suitably insulated from the plate 71. One of the elements 79 and 80 is an elongated contact and the other is a rheostat element, and these elements are duplicated at opposite sides of the vertical center of the plate 71 as will be described in connection with Figure 5. Therefore, it may be assumed that the numeral 79 designates a pair of elongated contacts and that the numeral 80 designates a pair of rheostat coils.

The lever 73 has connected thereto oppositely extending tension springs 81 and 82 each of which is carried by the upper end of a post 83 and the lower ends of these posts may be supported by a laterally extending arm 84 carried by a portion of the vehicle as shown in Figure 4. The bracket 75 may be supported by the same element if desired. It will be apparent that the springs 81 and 82 tend to maintain the lever in a central neutral position as shown in Figure 3, in which case the switch contacts 77 and 80 will be arranged between and slightly out of contact with all of the elements 79 and 80.

The lever 73 is provided at its upper end with an element adapted to offer resistance to the wind and shown in the present instance as a disk 85. It will be apparent that wind pressure against either side of the disk 85 will tend to move the lever 73. An arm 86 (Figure 3) carried by the lever 73 is provided with a slot 87 in which is arranged a pin 88 carried by the upper end of a rod 89. This rod extends through a bearing 90 formed in one head of a cylinder 100 in which is arranged a piston 101 connected to the lower end of the rod 89 and drilled to provide a leakage port 102.

The motor 52 may be controlled by the electrical system shown in Figure 5. The motor comprises an armature 103 and a field 104 and current is supplied to the motor by line wires 105 and 106 shown diagrammatically as being connected to the armature 103. The wire 105 is shown as having a switch 106 therein which is engageable by some part of the carriage 22 when the latter is in latched position to engage a contact 107 connected by a wire 108 to the contact 109 of a manual switch 110. Branch wires 111 and 112 extend from the respective wires 105 and 106 and these wires, in turn, are respectively connected to elongated contacts 113 and 114 which are the pair of contacts constituting the element 79 as indicated in Figure 4. Wires 115 and 116 lead respectively from the wires 111 and 112 to rheostat coils 117 and 118 which constitute the elements 80 as shown in Figure 4. The switch elements 77 and 78 are normally arranged in the neutral position shown in Figure 5 and are moved in one direction by the lever 73 to respectively engage the contact 113 and rheostat coil 118, or in the opposite direction to respectively engage the contact 114 and rheostat coil 117. The switch elements 77 and 78 are connected to the respective ends of the motor field 104 by wires 119 and 120.

The electrical system, of course, is provided with control means for releasing the tension of the shock cords 39 to reset the carriage 22 with the latch 24 engaging the lever hook 25, and to then manually operate the motor 52 to provide a normal tensioning of the shock cords. A double throw switch 121 has a wire 122 connected to the wire 120 and has its second wire 123 connected to the wire 112. The switch 121 is movable into engagement with contacts 125 and 126 the latter of which is connected by a wire 127 to the wire 119. The contact 125 is connected by a wire 128 to the wire 111. Accordingly, when the switch 121 is closed this switch, and the wires 123 and 127 connect the wire 119 to the wire 112 while the wires 122 and 128 connect the wires 111 and 120, independently of the switch elements 77. It will become apparent that the parts of the switch controlled by the deflectible member 85, when the switch 121 is closed, will be set to unwind rather than to wind the windlass drum 143, and accordingly the wires 119 and 120 are provided with cut-off switches 129 and 130 which are opened prior to the closing of the switch 121. The switches 129 and 130 have been shown as separate single throw switches for simplicity of illustration in Figure 5 and it will be obvious that any form of convenient switch mechanism may be employed and will be preferably connected in any desired conventional manner with the switch 121 so that the closing of the switch 121 will open the switches 129 and 130 and vice versa.

The operation of the apparatus is as follows:

It will be assumed that the apparatus is set with the shock cords 39 tensioned and with the carriage 29 latched in inoperative position ready to project the article 33 to be picked up by the plane. The loop 28 will have its horizontal portion 29 extending across and supported by the clips 30 at the upper ends of the masts. The set screw 70 will have been loosened and the plate 70 turned on its pivot 72 to set it with respect to the lever 67 according to the load to be picked up, as will become more apparent later.

Assuming that no wind is blowing the levers 67 and 73 will stand vertically as shown in solid lines in Figure 3. Under such conditions the contact elements 77 and 78 will occupy the neutral positions shown in Figure 5 out of engagement with both contact strips 113 and 114 and both rheostat coils 117 and 118. In Figure 3 the arrow pointing toward the disk 85 indicates a possible wind, it being apparent that the plane approaches from the right as shown in Figure 1. Assuming that the plane will approach at an air speed of 100 miles per hour and a head wind of 10 miles an hour starts to blow, the plane will approach at a land speed of 90 miles per hour. The catapult therefore will have been set to project the article at a speed of 10 miles per hour in excess of the land speed of the plane and will thus overshoot the plane when the pick-up operation is performed.

Assuming that a head wind is blowing the anemometer disk 85 will be moved to the right as viewed in Figure 3, for example, to the dotted line position shown in such figure. This operation turns the lever 73 about its pivot 74 and moves the contacts 77 and 78 respectively into engagement with the contact strip 114 and rheostat 117. All of the switches 106, 110, 129 and 130 will be closed under such conditions, as will become apparent, and the motor 52 will be energized to cause its worm 51 to drive the worm wheel 50 and thus rotate the windlass drum 43 through the worm 45 and worm wheel 44. The windlass drum will be rotated in a counterclockwise direction in Figure 3, thus unwinding the belt 41 from the drum 43. This operation relieves the tension of the shock cords 39 whereupon their tension will be overbalanced by the heavy spring 63 (Figure 3) to move the piston 61 toward the left and impart similar movement to the pulley 42 and consequently to the shafts 54 and 55 of this pulley. The shaft 55, engaging the fork 66 (Figures 3 and 4) will move the lower end of the lever 67 toward the left to move the plate 71 above the pivot 72 to the right. This obviously reverses relative movement of the contacts 77 and 78 with respect to the contact strip 114 and rheostat 117, the latter continuing to move until the neutral relative positions of the parts is restored. As soon as the contact strip 114 and rheostat 117 move out of engagement with the respective switch contacts 77 and 78, the motor 52 will be deenergized to stop the unwinding of the belt 41 and the apparatus will be so designed that the reduced tension of the shock cords 39 will provide the required force for projecting the article 33 at the land speed of the airplane when the latter passes over the apparatus.

Assuming that just prior to the approach of the airplane the wind will have been blowing in the opposite direction, it will be a tail wind with respect to the airplane increasing its land speed. For example, if the air speed of the airplane is 100 miles per hour and the tail wind is blowing at 10 miles per hour, the land speed of the plane as it passes over the apparatus will be 110 miles per hour. If the apparatus is therefore set to project the article at 100 miles per hour the pick-up operation will occur with the article travelling 10 miles per hour slower than the land speed of the plane, and this difference in speed can be a serious matter if a substantial weight is to be picked up as will be apparent.

With the present apparatus a tail wind will move the disk 85 and lever 73 to the left of the position shown in Figure 3, in which case the switch contacts 77 and 78 respectively engage the contact strip 113 and rheostat 118 to drive the windlass spool 43 in a clockwise direction as viewed in Figure 3 to wind the belt 41 and increase the loading of the shock cords 39. This winding operation pulls the belt 41 around the pulley 42 and at the same time the horizontal pull on the pulley 42 will be against the tension of the spring 61, the pulley 42 and associated elements moving to the right as viewed in Figure 3 as the spring 63 is increasingly loaded. This operation moves the portion of the plate 71 above the pivot 72 to the left in Figure 3 until the contact strip 113 and rheostat 118 are disengaged from the respective switch contacts 77 and 78. The motor 52 will then stop with the shock cords 39 properly tensioned to project the article 33 at the increased speed called for in accordance with what will be the land speed of the plane when it approaches.

Assuming that the plane now approaches for the pick-up operation, it will be flown over the apparatus as shown in Figure 1 and the engagement of the hook 12 with the horizontal portion 29 of the loop 28 will pull the loop from the fingers 30 and this operation effects the swinging of the lever 26 to release the latch elements 24 and 25. This operation and the parts required therefor form no part of the present invention per se and may be of any desired type. For example, the releasing of the catapult may be effected by the electrical release mechanism shown and described in the patent of Jeannot G. Ingres and Henry W. Hey, No. 2,356,671, dated August 22, 1944. Upon the releasing of the latch mechanism the catapult will project the load, acceleration of the carriage and the article taking place very rapidly and the article leaving the carriage at a speed closely approximating that of the plane to prevent the transmission of any shock loads thereto.

The sudden reduction in the tension of the shock cords incident to the projecting of the article will permit the spring 63 to project the piston 61 toward the left as viewed in Figure 3. The piston 61, with its bleed opening 62, mounted in the cylinder 60 provides a dashpot action to cushion movement of the piston 61. Movement of this piston to the left will take place without material shock, therefore, but its movement will turn the lever 67 and this operation will tend to close circuits by energizing the motor 52. This operation is undesirable, of course, and accordingly the switch 106 is provided for preventing energization of the motor, this switch being held in closed position by the carriage when the latter is latched in the position shown in Figure 1. Upon the releasing of the catapult, therefore, the motor circuit will be opened at the contact 107 and accordingly the motor will not operate upon the releasing of the catapult.

The parts of the motor and windlass will remain in the same positions as when the shock cords 39 were tensioned with the apparatus set for operation and in order to reset the apparatus it is necessary to unwind the belt 41 from the windlass drum 43 to permit the carriage 22 to be moved to latched position. The movement of the piston 61 to the left (Figure 3) will have turned the plate 71 to engage the switch under contacts 77 and 78 with the strip 113 and rheostat 118, which position of the switch elements corresponds to the operation which occurs when a tail wind is blowing, as previously described. If the circuit thus provided were permitted to control the motor 52, the latter would operate to turn the windlass drum 33 in a clockwise direction (Figure 3) to tend to increase the tension of the shock cords 39. For the resetting of the apparatus it is therefore necessary to prevent such controlling of the motor 52. In order to reset the carriage, therefore, the operator will open the switches 129 and 130 and close the switch 121. It will be assumed that the main control switch 110 will have remained closed, and it therefore will be necessary for the operator only to hold the switch 106 in closed position to effect energization of the motor 52. The circuit for the field 104 provided by the switch 121 corresponds to the circuit provided when the switch contacts 77 and 78 engage the contact strip 114 and rheostat 117. Thus the windlass drum 43 will turn in a counterclockwise direction (Figure 3) to unwind the belt 41. This operation is continued until the carriage 22 can be manually moved to latched position.

It will be apparent that when tension is relieved in the shock cords 39 to a sufficient extent to permit resetting of the carriage 22, the piston 61 will be approximately at the left hand end of the cylinder 60 (Figure 1) and the lever 67 and plate 71 thus will be moved to such a position with respect to the lever 73 that the switch contacts 77 and 78 (Figure 5) will be in engagement with the contact strips 113 and 118. Thus when the switch 121 is opened and the switches 129 and 130 are closed the motor 52 will be energized to rotate the windlass drum 43 in a clockwise direction to wind the belt 41 thereon. This winding operation will continue until the switch elements are restored to normal position, the progressive tensioning of the shock cords 39 progressively moving the pulley 42 and lever 67 to the right as viewed in Figure 3 until the neutral position is reached. The operation will then be arrested with the shock cords 39 properly tensioned according to the load to be projected, or with greater or less tensioning of the shock cords according to the position of the disk 85 and associated elements as will be obvious. In other words, the neutral position of the parts will be determined by the relationship between the position of the lever 67, and the position of the lever 73 as determined by the wind velocity.

It will be apparent that the springs 81 and 82 tend to hold the lever 73 in vertical position and these springs are tensioned to provide whatever degree of movement of the lever 73 is desired between vertical position and maximum deflection in either direction. With the arrangement of the parts shown, the maximum deflection of the lever 73 will be relatively slight with a relatively substantial tensioning of the springs 81 and 82 in which case sudden slight gusts of wind will not materially change the position of the disk 85. The piston 101 and its bleed passage 102 operating in the small cylinder 100 affords a dashpot action to tend to prevent sudden movements of the disk 85 under the influence of sudden gusts of wind. The dashpot, however, will not have any effect on the positions of the parts under the influence of steady wind pressures.

The switch element associated with the levers 67 and 73 provide, in effect, a follow-up action of the switch elements with respect to each other upon movement out of normal position of either the plate 71 or the switch elements 77 or 78. The elements 117 and 118 may be ordinary contacts of low resistance instead of rheostat coils. The latter have been illustrated since, because of the resistance of these coils, slight deflection of the lever 73 will close the circuit through the motor 52 with substantial resistance therein so as to provide for slow operation of the motor. Such operation for slight deflections changes the tension of the shock cords 39 sufficiently rapidly. If a relatively heavy wind starts to blow increased deflection takes place and the switch element 78 will engage one or the other rheostat element at a point where its resistance is materially lowered thus providing for greater speed in changing the tensioning of the shock cords.

The plate 71 may be suitably calibrated (not shown) with respect to the lever 67 so as to secure a proper adjustment of the relative positions of these elements in accordance with the load to be projected. If the load is lighter than the load projected in the previous operation of the apparatus, the nut 70 may be loosened and the plate 71 turned in a counterclockwise direction about the pivot 72, whereupon the nut 70 may be tightened. This operation turns the plate 71 and associated elements with respect to the switch contacts 77 and 78 so as to provide the desired reduced tensioning of the shock cords 39. The adjustment may be made in the opposite direction if heavier loads are to be projected.

From the foregoing it will be apparent that the present apparatus provides for the generation of a force tending to move a catapault carriage at a given predetermined speed for a given load in the carriage in accordance with a predetermined approximate speed of operation of an airplane, and that it provides means functioning automatically to vary the loading of the force applying means in accordance with variations in the plane speed incident to the speed of the wind when the plane is flying in its pick-up position. The device quickly varies the loading of the shock cord for either a head wind or tail wind, and the variation in the loading of the shock cord occurs in direct proportion to the wind velocity to project the load quite accurately in accordance with the land speed of the airplane.

The term "catapault" in the appended claims is used in a general sense to indicate the structure in or on which is arranged the article to be projected and through which the force for projecting the article is directly transmitted to the article. As applied specifically to the disclosure of the present apparatus, the term "catapult" would define the carriage 22.

It is to be understood that the form of the invention herewith shown and described is to be taken as a preferred example of the same and that various changes in the shape, size and arrangement of parts may be resorted to as do not depart from the spirit of the invention or the scope of the subjoined claims.

I claim:

1. An airplane pick-up mechanism comprising a catapult, a source of power for operating the catapult to project an article therefrom to be picked up by an airplane passing thereover at a known approximate air speed, and a control system for said source of power responsive to variations in wind velocity to increase the application of power from said source to said catapult in accordance with the velocity of a tail wind blowing with respect to the pick-up plane whereby the article will be projected approximately at the land speed of the airplane.

2. An airplane pick-up mechanism comprising a catapult, a source of power for operating the catapult to project an article therefrom to be picked up by an airplane passing thereover at a known approximate air speed, a control system for said power source to vary the application of power therefrom to the catapult, said system including a wind-responsive device, and means operatively connecting said wind-responsive device to said power source to control the latter to respectively increase and decrease the application of power to the catapult in accordance with the blowing of a tail wind or head wind with respect to the pick-up plane whereby the article will be projected approximately at the land speed of the plane.

3. An airplane pick-up mechanism comprising a catapult, power means for applying a force tending to move the catapult to project an article carried thereby, a latch normally holding said catapult against movement, means operative by a plane passing over the catapult in a given direction for releasing said latch, and means operable while said catapult is held by said latch for varying the force being applied by said power means to said catapult in accordance with wind direction and velocity whereby, when said latch is released, the article will be projected approximately at the land speed of the plane.

4. An airplane pick-up mechanism comprising a catapult, power means for applying a force tending to move the catapult to project an article carried thereby, a latch normally holding said catapult against movement, means operative by a plane passing over the catapult in a given direction for releasing said latch, and means operable while said catapult is held by said latch for varying the force being applied by said power means to said catapult, and means responsive to wind direction and velocity for operating said last named means to increase or decrease the force of said power means in accordance with the direction and velocity of the wind whereby, when said latch is released, the article will be projected approximately at the land speed of the airplane.

5. An airplane pick-up mechanism comprising a catapult, a source of power for operating the catapult to project an article therefrom to be picked up by an airplane passing thereover at a known approximate air speed, a mechanism operatively connected to said power source and operable for determining the power generated by said source, a wind-responsive mechanism having an element movable in a direction according to wind direction and to an extent proportional to wind velocity, and means inter-connecting said mechanisms to operate said mechanism operatively connected to said power source in accordance with operation of said element of said wind-responsive mechanism whereby power will be delivered from said source to said catapult to project the article at the approximate land speed of the airplane.

6. An airplane pick-up mechanism comprising a catapult, a source of power for operating the catapult to project an article therefrom to be picked up by an airplane passing thereover at a known approximate air speed, a mechanism having mechanical connection with said power source for determining the power generated by said source, a second mechanism operable in a direction according to wind direction and to an extent proportional to wind velocity, and a follow-up control mechanism interconnecting said mechanisms whereby the first named mechanism will cause said source to develop power proportional to the extent and direction of operation of said second mechanism, whereby said source will cause said catapult to project the article approximately at the land speed of the airplane.

7. An airplane pick-up mechanism comprising a catapult, a tensionable source of power for operating the catapult to project an article therefrom to be picked up by an airplane passing thereover at a known approximate air speed, a mechanism connected to said power source and operative for varying the tension of said power source, a second mechanism arranged to be wind deflectible in opposite directions from a normal position in accordance with the direction of the wind and to an extent proportional to the wind velocity, and means inter-connecting said mechanisms for causing the first named mechanism to tension said power source in accordance with the direction and velocity of the wind whereby the article will be projected by the catapult at a speed approximating the land speed of the airplane.

8. Apparatus constructed in accordance with claim 7 wherein said means comprises a follow-up control mechanism having a pair of devices one deflectible in a direction and to an extent corresponding with the deflection of said second mechanism, the other device being constructed and arranged to follow-up with respect to the first mentioned device and to control the tension of said power source.

9. An airplane pick-up mechanism comprising a catapult adapted to hold an article to be projected, a loop connected to the article, means for supporting said loop in a position to be engaged by an airplane-carried pick-up element, a source of power for operating the catapult, means for rendering said power source effective for projecting the catapult upon the pulling of the loop by the airplane-carried element, and means responsive to wind direction and velocity for controlling the speed at which the catapult will project the article whereby the latter will be projected at a speed approximating the land speed of the airplane.

10. An airplane pick-up mechanism comprising a catapult adapted to hold an article to be projected, a loop connected to the article, means for supporting said loop in a position to be engaged by an airplane-carried pick-up element, a source of power for operating the catapult, means for rendering said power source effective for projecting the catapult upon the pulling of the loop by the airplane-carried element, and means for varying the effective force applied by said power source to said catapult, said means comprising a control device responsive to wind velocity and direction whereby the force applied to the catapult will project the article approximately at the land speed of the airplane.

11. An airplane pick-up mechanism comprising a catapult adapted to hold an article to be projected, a power source energizable to exert a force tending to operate said catapult, a latch for holding said catapult against movement by said power source, means for releasing said latch upon the passage over the pick-up mechanism of an airplane having a pick-up element, a mechanism connected to said power source and operable for varying the power generated by said source, a second mechanism movable in opposite directions according to the direction of the wind and movable to an extent corresponding to wind velocity, and means inter-connecting said mechanisms whereby the first named mechanism causes generation of power to an extent necessary to project the article at a speed approximating that of the land speed of the airplane.

12. Apparatus constructed in accordance with claim 11 wherein said means comprises a follow-up control mechanism having a pair of elements one of which is deflectible in opposite directions from a normal position in accordance with the deflection of said second mechanism, and the other of which is constructed and arranged to follow up with respect to the first mentioned element to control the operation of the first named mechanism.

13. An airplane pick-up mechanism comprising a catapult adapted to hold an article to be projected, a source of power for exerting a force tending to operate said catapult, a latch normally holding said catapult against movement, a loop connected to the article on the catapult, means for supporting said loop in a position to be engaged by an airplane-carried pick-up element, means for releasing said latch upon the engagement of said pick-up element with said loop, a mechanism connected to said power source and operative for controlling energization of said source to determine the speed at which the article will be projected when said latch is released, a second mechanism movable in opposite directions from a normal position in accordance with wind direction and to an extent proportionate to wind velocity, and means for controlling the first named mechanism in accordance with the direction and extent of deflection of the second named mechanism whereby said source will operate said catapult to project the article at a speed approximating the land speed of the airplane.

14. Apparatus constructed in accordance with claim 13 wherein said last named means comprises a follow-up control mechanism responsive to deflection of said second mechanism and to operation of the first named mechanism whereby the latter causes energization of said power source in accordance with the direction and velocity of the wind.

15. An airplane pick-up mechanism comprising a catapult adapted to hold an article to be projected, a tensionable device connected to the catapult to effect movement thereof, a latch normally holding said catapult against movement, a reversible electric motor, means connected to and operated by said motor and connected to said tensionable means to determine the tensioning thereof, and means having connection with said motor and controlled in accordance with the direction and velocity of the wind for controlling said motor to determine the power developed by said tensionable means to cause the article to be projected approximately at the land speed of the airplane when said latch is released.

16. Apparatus constructed in accordance with claim 15 wherein said last named means comprises an element deflectible in opposite directions from a normal position in accordance with the direction of the wind and to an extent proportionate to wind velocity, and a control mechanism for said motor for energizing the latter to increase or decrease the tension of said tensionable means in accordance with the position of said deflectible member.

JOHN X. PHILLIPS.